Patented Dec. 22, 1931

1,837,332

UNITED STATES PATENT OFFICE

BEVERLY OBER, EDWARD H. WIGHT, AND WILLIAM H. WAGGAMAN, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING PHOSPHATIC FERTILIZERS

No Drawing. Application filed November 26, 1927, Serial No. 236,005. Renewed October 8, 1931.

This invention relates to fertilizers, and more particularly to a process for manufacturing phosphatic fertilizers.

According to the usual method of preparing phosphatic fertilizers, ground phosphatic rock is mixed with sulphuric acid in an open pan and the mixture subsequently run into a den. It is allowed to remain here for a specified time, during which time the reactions within the mass continue with the ultimate formation of available phosphate salts. This den product, while containing an appreciable amount of agriculturally available phosphates, is in a damp condition, having excess water and free acid. To remove these it is customary to dust the mass with some acid absorbent and to deposit it in a storage shed to permit aeration and subsequent drying. Such methods are uneconomical, necessitating as they do a long curing period and large outlays in plant equipment.

It is an object of our invention to greatly reduce the time required for the production of phosphatic fertilizers.

Another object is to provide a method of drying fertilizers rapidly and effectively.

A further object is to generally decrease the production cost of fertilizers by utilizing elements of apparatus to perform a plurality of steps of the process.

Yet another object is to eliminate the storage period required heretofore in phosphatic fertilizer production.

With these and other important objects in view, our invention comprehends the acidulation of ground phosphatic material under conditions regulated and controlled to produce available phosphates and the subsequent drying of the product by effectively applied internal heat.

We have found, as disclosed in our copending application, Serial No. 179,706, filed March 30, 1927, that a very desirable fertilizer product may be obtained by mixing ground phosphate rock and an acid and allowing the materials to react in an autoclave. As fully disclosed in that application, by regulating the temperatures and pressures of the reactive mass we are enabled to exercise an effective control of the reactivity of the ingredients and hence to maintain the mass in a mixable condition for any predetermined time. Such a process permits a thorough incorporation of dust and acid and insures an optimum acidulation. In carrying out the process according to the disclosure of that application, the mixing was continued to any desired extent after which the secondary reactions were allowed to proceed by applying heat to the mass or by relieving pressure. After the conversion stage, that is to say, after the conversion of the insoluble phosphate to the available forms, the product was dried. This step was carried out in the autoclave itself and was accomplished by imposing a vacuum or reversed pressure on the material.

We have found that the autoclave product may be dried by applying external heat to the material, either by forcing a heating medium, such as steam, through the thermal jacket of the autoclave or by heating the autoclave itself by means of a commercial heating apparatus. While such a method does dry the product it was found that it requires a relatively extended period of treatment. We believe this to be due to the fact that certain products of the reaction cake on the shell of the autoclave and form a coating thereover. In cases where a rotary autoclave is used this coating forms over the whole of the interior shell. These products have a low thermal conductivity and, in effect, act as an insulating agent and greatly diminish the heat transfer from the heating apparatus or superheated steam to the mass within the autoclave. The present invention overcomes these disadvantages and is especially adapted to our autoclave process. It will be appreciated, however, that it is not necessarily limited to use with the particular processes mentioned but may be employed generally in a fertilizer industry where similar problems are encountered and a comparable result is desired.

In carrying out the process, we prefer to employ an autoclave adapted to rotate on hollow shafts, protected by stuffing boxes. In one of the hollow shafts may nest a fluid outlet line connected to a vacuum pump, neutralizing tank, and condenser, as described in the copending application Serial No. 172,359, filed March 3, 1927. The other shaft may enclose an acid inlet line and a second conduit which is connected to a source of heat in the manner to be described more in detail.

The phosphate rock dust may be admitted through a manhole in the autoclave which is then sealed and the acid injected under pump or gravity pressure through the acid inlet line. The autoclave may be rotated to mix the ingredients. If desired, the acid and rock dust may be mixed outside the autoclave and admitted as a sludge thereto. The mass within the container may be subjected to the action of a cooling medium or to superatmospheric pressures to retard reactivity and prevent the material from settling as a solid mass, in accordance with the principles set forth in the co-pending application Serial No. 179,706.

After the materials have been mixed for the desired period of time the pressure may be relieved or the temperature increased to initiate and accelerate the secondary reactions with the consequent formation of the solid end products, such as mono and dicalcium phosphate and calcium sulphate. A certain amount of the pasty mass will have adhered to the interior surfaces of the autoclave. During the conversion period and early stages of drying this cakes or hardens to form a coating of appreciable thickness containing substantial amounts of compounds of low thermal conductivity.

We propose to dry the mass by utilizing the full caloric effect of the thermal units of a heating medium which is passed in direct contact with the damp mass to maintain drying heats under vacuum conditions. In this way we greatly increase the thermal efficiency, for not only do we avoid heat losses incident to an attempt to transfer heat through the insulating coat of reaction products but we utilize this coat to prevent heat losses by radiation. That is to say, since the heat is applied internally the low conductive coating diminishes transfer of heat from the interior to the metal shell of the autoclave and hence prevents dissipation of heat by radiation from the shell.

We may supply heat to the interior of the autoclave in a number of ways. According to one method, we provide a furnace, situated conveniently near the autoclave to generate the drying heat. This is constructed with a series of baffles in the upper portion which may be heated in any desired manner, such as by gas or oil burners. To the furnace there are connected valved air inlet and outlet lines. One end of the outlet line is nested in the shaft of the autoclave, while the inlet line opens to the atmosphere or to a gas storage. In operation air is admitted to the furnace and passed in a circuitous path over the heated baffles. During this passage the air is heated, and while at a high temperature is forced directly to the interior of the autoclave. The air may be coursed through the furnace by a force pump situated in the inlet line or a suction pump located in the outlet line. We prefer, however, to utilize a pressure differential between the interior and exterior of the autoclave for admitting the air. This pressure differential is valuable not only because it insures a rapid admission of the heating medium but also because it disseminates the heat equally through the mass.

At the termination of the conversion period the vacuum pump is preferably operated for a minute or more. During this time, it will be understood, the valves in the acid inlet line and hot air line are closed and hence a partial vacuum or a reversed pressure will be set up in the interior of the autoclave. It will be understood that the operation of the vacuum pump withdraws volatilized moisture from the product. This progressively cools the mass and if continued beyond a predetermined period would lower the temperature below the point where drying may be effectively carried on. Before the temperature has been lowered to such a degree the valve in the vacuum draw off may be closed and that in the hot air line is opened. The vacuum then acts as a suction pump to draw the heated air directly into the autoclave. We have found that the autoclave product can be quickly and effectively dried by carrying on this operation intermittently, that is to say, by alternately evacuating and reheating. This process when repeated five times more or less, reduces the water content to such a degree that the product may immediately be put through a grinding machine. The effectiveness of the intermittent heating probably is due to the fact that the free water vaporized by the heated air is withdrawn by the subsequent evacuation before it has had an opportunity to cool sufficiently to liquefy. After the first reheating the vacuum pump withdraws the vaporized water and as the pressure is progressively lowered more of the occluded moisture is caused to evaporate, since the temperature does not drop commensurately with the pressure. We have found that on some runs good results are obtained when the evacuation periods are continued for about a minute and the heating periods for approximately twelve minutes. We are well aware, however, that the time for which the respective periods are carried on may be varied considerably and hence we do not intend to be limited to the precise intervals stated, nor to the proportionate lengths of the evacuation and reheating periods respectively.

It is to be understood that our main concern is to maintain drying heats during the evacuation or vacuum period. The higher the temperature is maintained during the evacuation period (below such a temperature as will damage the product) the shorter will be the drying period. We have found, as described, that this can be accomplished by intermittently evacuating and reheating. It is to be clearly understood, however, that our invention is not limited to this step. We may, if we desire, carry on the process continuously by operating the vacuum pump and continuously admitting a heating medium in such regulated quantities as will maintain the mass at the desired temperatures. Such a process requires a more careful manipulation than the intermittent method and hence is not as well suited for actual factory practice.

It will appear that the described method is peculiarly well adapted to the process of autoclaving. The vacuum pump may be used initially to pull a partial vacuum on a quantity of rock dust which has been deposited in the autoclave. Thereafter the valve in the acid inlet line may be opened; the pressure differential between the interior and exterior of the autoclave causes the rapid injection of the acid and sprays this over the body of dust. After the acid and rock have been mixed and the conditions adjusted to effect conversion of the insoluble phosphate the vacuum pump is again utilized to draw in the heating medium for drying purposes and discharging vapors.

Since the invention comprehends broadly the concept of drying a damp mass of phosphatic material by maintaining optimum thermal conditions during vacuum drying by the action of direct heat, it may be effectuated by other specific methods. We have described the process of drying by the introduction of hot gas either by the use of a vacuum within the container or by a pump interposed in the hot fluid lines. The same result may be accomplished by introducing superheated steam directly into the autoclave. In such a case a steam generator is used in lieu of the furnace and the superheated steam forced in under its own pressure supplemented, if desired, by suitably positioned pumps. The operation of such an apparatus is substantially the same as that which obtains when the furnace is employed.

At the completion of the conversion or digestion period the steam is forcibly injected into the autoclave and the material therein heated for the requisite period. The first injection of steam may be made more rapid by supplementing the pressure of the steam generator by a partial vacuum previously set up in the autoclave. After this first heating the vacuum pump is operated for the desired period, withdrawing water vapor from the interior. This process is repeated, in the manner already described, until the water content of the product has been lowered to the desired degree. As has been described the heating medium may be admitted substantially continuously during the vacuum drying stage.

Similarly we may employ a direct flame for drying purposes. Such a method may be effectively carried out by mounting a conduit in the hollow shaft and providing the end of the conduit with a suitably designed nozzle. The mode of operation of this modification is essentially similar to those described, that is to say the temperature of the phosphate product is raised by internally applied heat, for the desired interval, by the direct flame and the autoclave alternately or continuously evacuated to remove volatilized water.

It will now be seen that we have provided a process for manufacturing phosphatic manures which may be carried out without subjecting the product to an extended curing period. The damp phosphate mass may be dried to any desired degree in a minimum of time by utilizing economical methods.

While we have described several specific methods of carrying out our invention, it is to be understood that these are given merely by way of examples for since the underlying principles may be embodied in other modes and effectuated by utilizing other specific apparatus, we do not intend to be limited beyond its comprehensive scope as defined in the appended claims.

We claim:

1. A process of manufacturing phosphatic fertilizer comprising treating insoluble phosphatic material with an acid to form vailable phosphate and subsequently drying the mass by subjecting it to intermittent conditions while maintaining drying temperatures.

2. A process of manufacturing phosphatic fertilizer comprising treating insoluble phosphatic material with an acid to form available phosphate, intermittently heating the mass and alternately subjecting it to a vacuum to dry it.

3. A process of manufacturing fertilizer comprising treating insoluble phosphatic material with an acid in a confined space to form available phosphate, alternately evacuating the space and admitting a heating medium to said confined space to dry the product.

4. A process of manufacturing fertilizers comprising treating insoluble phosphatic material with an acid in a confined space, evacuating the space and then admitting a heating medium in direct contact with the mass therein and regulating the admission of the heating medium so as to maintain the reduced pressure.

5. A process of manufacturing fertilizers comprising treating phosphatic material with sulphuric acid, allowing these to react in a sealed zone to form available phosphates, alternately reducing the pressure in the zone below atmospheric and then injecting a heated gas into the autoclave in direct contact with the mass for predetermined intervals.

6. A method of drying phosphate fertilizer materials comprising subjecting the material in a zone in which pressures may be maintained to alternate heating and evacuation steps.

7. A method of drying phosphate materials comprising depositing the material in a confined space, intermittently lowering the pressure therein with respect to the pressure of a body of heating fluid and admitting the heating fluid into the space.

In testimony whereof we affix our signature.

BEVERLY OBER.
EDWARD H. WIGHT.
WILLIAM H. WAGGAMAN.